US012585382B2

(12) United States Patent
    Ogle

(10) Patent No.: US 12,585,382 B2
(45) Date of Patent: **\*Mar. 24, 2026**

(54) MULTI-HOST TOUCH DISPLAY

(71) Applicant: Macro-Blue Inc., Moorpark, CA (US)

(72) Inventor: Howard Ogle, Moorpark, CA (US)

(73) Assignee: Macro-Blue Inc., Moorpark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/943,417

(22) Filed: Nov. 11, 2024

(65) Prior Publication Data

US 2025/0306755 A1     Oct. 2, 2025

Related U.S. Application Data

(63) Continuation of application No. 18/349,758, filed on Jul. 10, 2023, now Pat. No. 12,141,434, which is a continuation of application No. 17/874,592, filed on Jul. 27, 2022, now Pat. No. 11,698,724.

(60) Provisional application No. 63/226,074, filed on Jul. 27, 2021.

(51) Int. Cl.
G06F 3/04886        (2022.01)

(52) U.S. Cl.
CPC .................... G06F 3/04886 (2013.01); *G06F 2203/04104* (2013.01)

(58) Field of Classification Search
CPC .. G06F 3/041; G06F 3/04186; G06F 3/04886; G06F 2203/04104; G06F 3/038; G06F 3/0488; G06F 3/1423; G09G 5/14
See application file for complete search history.

(56) References Cited

U.S. PATENT DOCUMENTS

| | | | | |
|---|---|---|---|---|
| 11,698,724 B2 * | 7/2023 | Ogle | ................... | G06F 3/04886 |
| | | | | 345/173 |
| 12,141,434 B2 * | 11/2024 | Ogle | ........................ | G09G 5/14 |
| 2003/0080940 A1 * | 5/2003 | Kawasome | ........... | G06F 3/0481 |
| | | | | 345/157 |
| 2007/0120763 A1 | 5/2007 | De Paepe et al. | | |
| 2011/0163966 A1 | 7/2011 | Chaudhri | | |
| 2015/0077356 A1 | 3/2015 | Choi et al. | | |
| 2018/0275812 A1 | 9/2018 | Lee et al. | | |
| 2018/0329572 A1 | 11/2018 | Gupta et al. | | |

(Continued)

OTHER PUBLICATIONS

European Patent Office, European Extended Search Report mailed on May 14, 2025, issued in connection with European Application No. 22850222.5, 10 pages.

(Continued)

*Primary Examiner* — Rodney Amadiz
(74) *Attorney, Agent, or Firm* — Lee Sullivan Shea & Smith LLP

(57)        ABSTRACT

An example multi-zone touchscreen device is configured to receive multiple feeds of touchscreen display data from different respective data sources. The touchscreen device scales the respective feeds of touchscreen display data for concurrent display in predefined regions of a touch-sensitive display. The touchscreen device receives a touch input in one of the predefined regions of the touch-sensitive display and applies a reverse scaling to the selected touchscreen display data to determine a location of the selection in the original data feed. The touchscreen device then communicates the location of the selection to the source of the original data feed.

20 Claims, 7 Drawing Sheets

(56) References Cited

U.S. PATENT DOCUMENTS

| | | |
|---|---|---|
| 2019/0227666 A1 | 7/2019 | Lee et al. |
| 2019/0310734 A1 | 10/2019 | Hotelling et al. |
| 2021/0224350 A1 | 7/2021 | Knox |
| 2022/0137767 A1 | 5/2022 | Astley et al. |
| 2022/0137786 A1 | 5/2022 | Kim et al. |
| 2022/0398012 A1 | 12/2022 | Gray et al. |

OTHER PUBLICATIONS

International Searching Authority, PCT International Search Report and Written Opinion, PCT International Application No. PCT/US22/38452, dated Dec. 6, 2022, 10 pages.

* cited by examiner

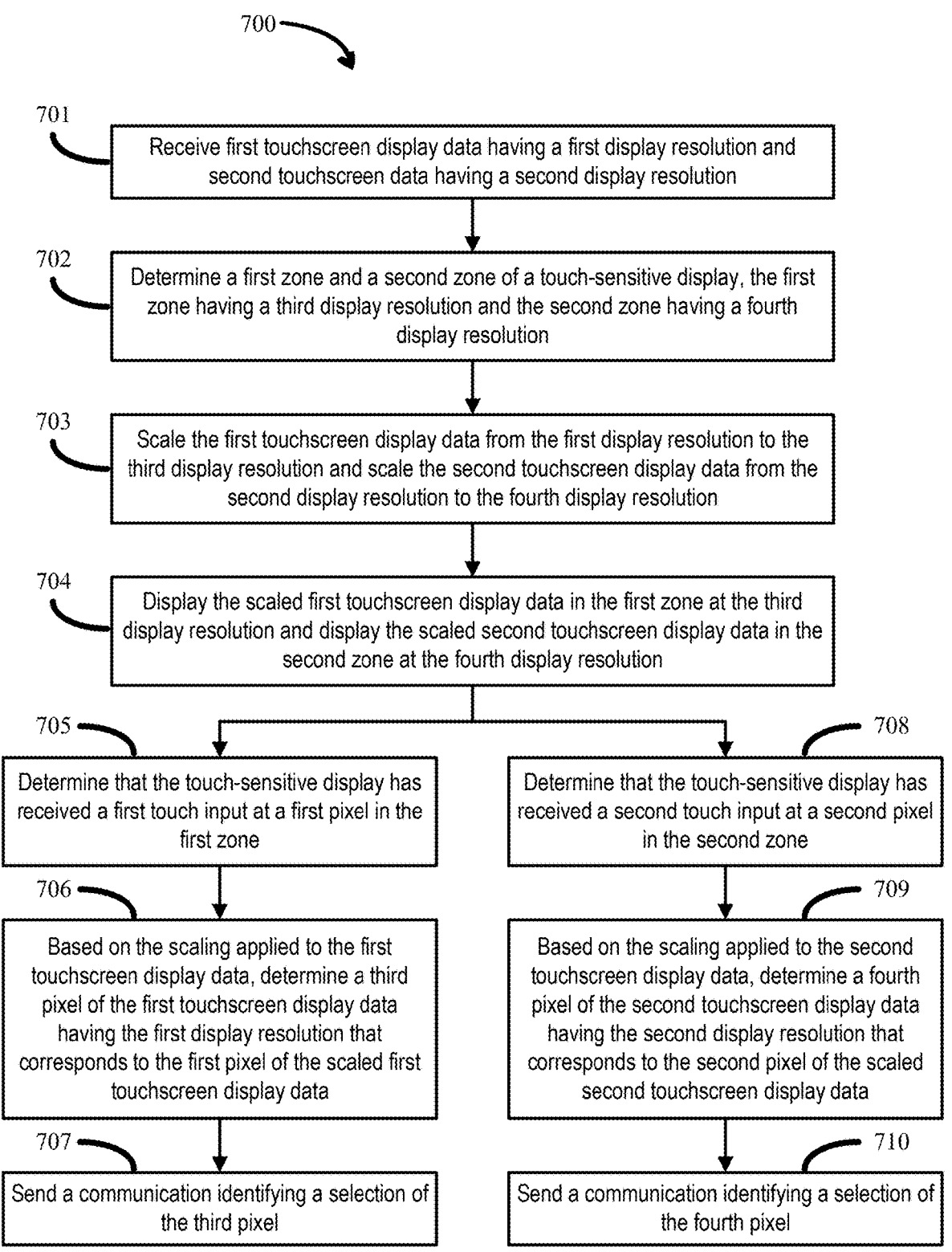

700

701 Receive first touchscreen display data having a first display resolution and second touchscreen data having a second display resolution 702 Determine a first zone and a second zone of a touch-sensitive display, the first zone having a third display resolution and the second zone having a fourth display resolution 703 Scale the first touchscreen display data from the first display resolution to the third display resolution and scale the second touchscreen display data from the second display resolution to the fourth display resolution 704 Display the scaled first touchscreen display data in the first zone at the third display resolution and display the scaled second touchscreen display data in the second zone at the fourth display resolution 705 Determine that the touch-sensitive display has received a first touch input at a first pixel in the first zone 706 Based on the scaling applied to the first touchscreen display data, determine a third pixel of the first touchscreen display data having the first display resolution that corresponds to the first pixel of the scaled first touchscreen display data 707 Send a communication identifying a selection of the third pixel 708 Determine that the touch-sensitive display has received a second touch input at a second pixel in the second zone 709 Based on the scaling applied to the second touchscreen display data, determine a fourth pixel of the second touchscreen display data having the second display resolution that corresponds to the second pixel of the scaled second touchscreen display data 710 Send a communication identifying a selection of the fourth pixel

*Fig. 7*

MULTI-HOST TOUCH DISPLAY

CROSS-REFERENCE TO RELATED APPLICATIONS

This application claims the benefit of priority under 35 U.S.C. § 120 to U.S. application Ser. No. 18/349,758, filed Jul. 10, 2023, entitled "Multi-Host Touch Display," which claims the benefit of priority under 35 U.S.C. § 120 to U.S. application Ser. No. 17/874,592, filed Jul. 27, 2022, entitled "Multi-Host Touch Display," which claims the benefit of priority under 35 U.S.C. § 119 to U.S. Provisional Patent App. No. 63/226,074, filed on Jul. 27, 2021, the content of each of which is incorporated herein by reference in its entirety.

FIELD OF THE DISCLOSURE

The present disclosure is related to using a single touch-screen display as a user interface for controlling a plurality of separate computing devices through a single view of the touchscreen display.

BACKGROUND

A touchscreen device allows a user to interact directly with displayed content by overlaying a touch-sensitive panel on top of a display. This combination is sometimes referred to as a touch-sensitive display. The user may interact with the touch-sensitive display by touching the display using their fingers or a stylus.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 7 depicts a flowchart of operations carried out by a touchscreen device according to an example embodiment.

Figure 1:
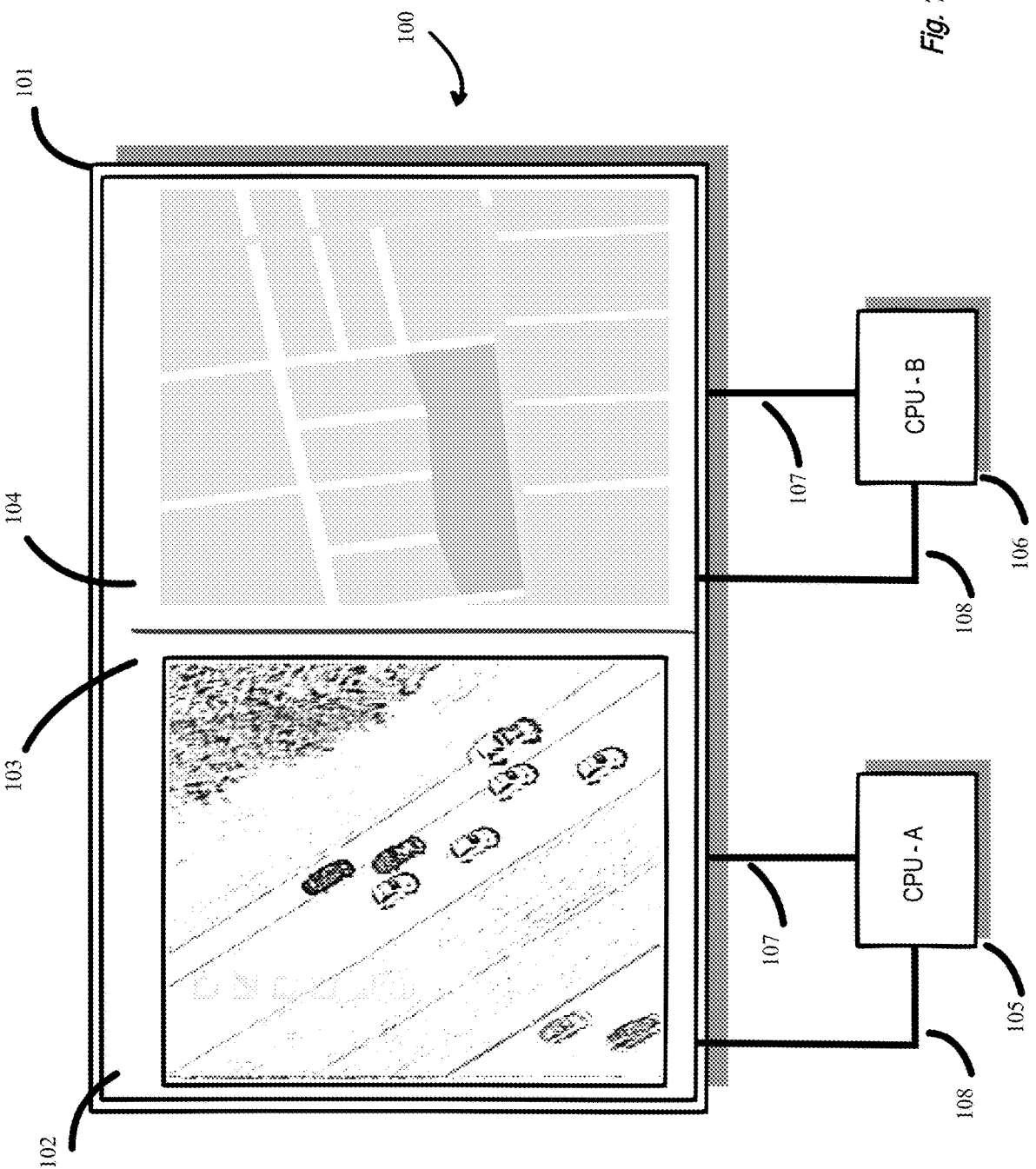
FIG. 1 depicts a simplified illustration of a touchscreen device according to an example embodiment.

The drawings are for the purpose of illustrating example embodiments, but those of ordinary skill in the art will understand that the technology disclosed herein is not limited to the arrangements and/or instrumentality shown in the drawings.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. OVERVIEW

Some touchscreen devices may be configured to receive and display input data from multiple different sources. For example, complex vehicle control systems, such as those found in helicopters, may include a touchscreen device configured to receive and display logistical information, video data from one or more cameras, and sensor data from various flight control sensors. Other examples are possible as well.

In order to receive and display input data from multiple different sources, conventional touchscreen devices have been configured to receive the input data on different input channels while only displaying one channel at a time. Such a touchscreen device may include a control for switching between inputs, such as a rotary switch, and the touchscreen device may display only the input selected by the control.

This conventional approach to receiving and displaying input data from multiple different sources on a touchscreen device leaves room for improvement. For instance, a user may wish to view and interact with touchscreen data from multiple sources concurrently, but conventional touchscreen devices only capable of displaying input from a single source at a time do not provide this functionality.

To help address these or other issues, disclosed herein are example touchscreen devices configured to use a single touchscreen display as a user interface for controlling a plurality of separate computing devices through a single view of the touchscreen display.

II. EXAMPLE TOUCHSCREEN DEVICES AND OPERATIONS

FIG. 1 depicts a simplified illustration of an example touchscreen device 100. As shown, the device 100 includes a display 101 and a touch-sensitive layer 102 overlaid on the display 101. The display 101 is configured to present display data from multiple different sources in different respective zones of the display 101. As shown, the display 101 includes a first display zone 103 and a second display zone 104, but the display 101 may include more or fewer display zones in other examples.

The touchscreen device 100 is electrically coupled to multiple different computing devices that act as the multiple different sources of the display data. As shown, the touchscreen device 100 is coupled to a first computing device 105 and a second computing device 106. Namely, the display 101 is connected to the computing devices 105 and 106 by a first type of connection 107, and the touch-sensitive layer 102 is connected to the computing devices 105 and 106 by a second type of connection 108. And while FIG. 1 depicts the computing devices 105 and 106 as central processing units (CPUs), the computing devices 105 and 106 may include additional or alternative computing device components as well.

As used herein, the term "computing device" may refer to any device that includes one or more of the following: (i) a processor, (ii) a data storage, and (iii) a communication interface, any or all of which may be connected by a communication link that may take the form of a system bus, a communication network such as a public, private, or hybrid cloud, or some other connection mechanism.

In such a computing device, the processor may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. It should also be understood that the processor could comprise processing components that are distributed across a plurality of physical computing devices connected via a network, such as a computing cluster of a public, private, or hybrid cloud.

The data storage of the computing device may comprise one or more non-transitory computer-readable storage mediums that are collectively configured to store (i) program instructions that are executable by the processor such that the computing device is configured to perform some or all of the functions disclosed herein and (ii) data that may be received, derived, or otherwise stored, for example, in one or more databases, file systems, or the like, by the computing device in connection with the functions disclosed herein. In this respect, the one or more non-transitory computer-readable storage mediums of the data storage may take various forms, examples of which may include volatile storage mediums such as random-access memory, registers, cache, etc. and non-volatile storage mediums such as read-only memory, a hard-disk drive, a solid-state drive, flash memory, an optical-storage device, etc. It should also be understood that the data storage may comprise computer-readable storage mediums that are distributed across a plurality of physical computing devices connected via a network, such as a storage cluster of a public, private, or hybrid cloud. The data storage may take other forms and/or store data in other manners as well.

The communication interface of the computing device may be configured to facilitate wired and/or wireless communication with external data sources and/or computing devices, such as the touchscreen device 100 in FIG. 1. As such, the communication interface may take any suitable form for carrying out these functions, examples of which may include an Ethernet interface, a Wi-Fi network interface, a cellular network interface, a serial bus interface (e.g., Firewire, USB 3.0, etc.), a chipset and antenna adapted to facilitate wireless communication (e.g., using short-range wireless protocols), and/or any other interface that provides for wireless and/or wired communication, among other possibilities. The communication interface may also include multiple communication interfaces of different types. Other configurations are possible as well.

As described in further detail below, in operation, the display 101 receives respective display data from the computing devices 105 and 106 through the first type of connection 107 and presents the display data in respective zones of the display 101. For instance, the display 101 presents the display data from the first computing device 105 in the first display zone 103, and the display 101 presents the display data from the second computing device 106 in the second display zone 104. Then, responsive to receiving a touch input in the first display zone 103 or the second display zone 104, the touchscreen device 100 sends a communication to the appropriate computing device indicating the touch input. For instance, if the touch-sensitive display 102 receives a touch input in the first display zone 103, then the touchscreen device 100 may send a communication through the second type of connection 108 to the first computing device 105 identifying a location of the touch input. Similarly, if the touch-sensitive display 102 receives a touch input in the second display zone 104, then the touchscreen device 100 may send a communication through the second type of connection 108 to the second computing device 106 identifying a location of the touch input.

Figure 2:
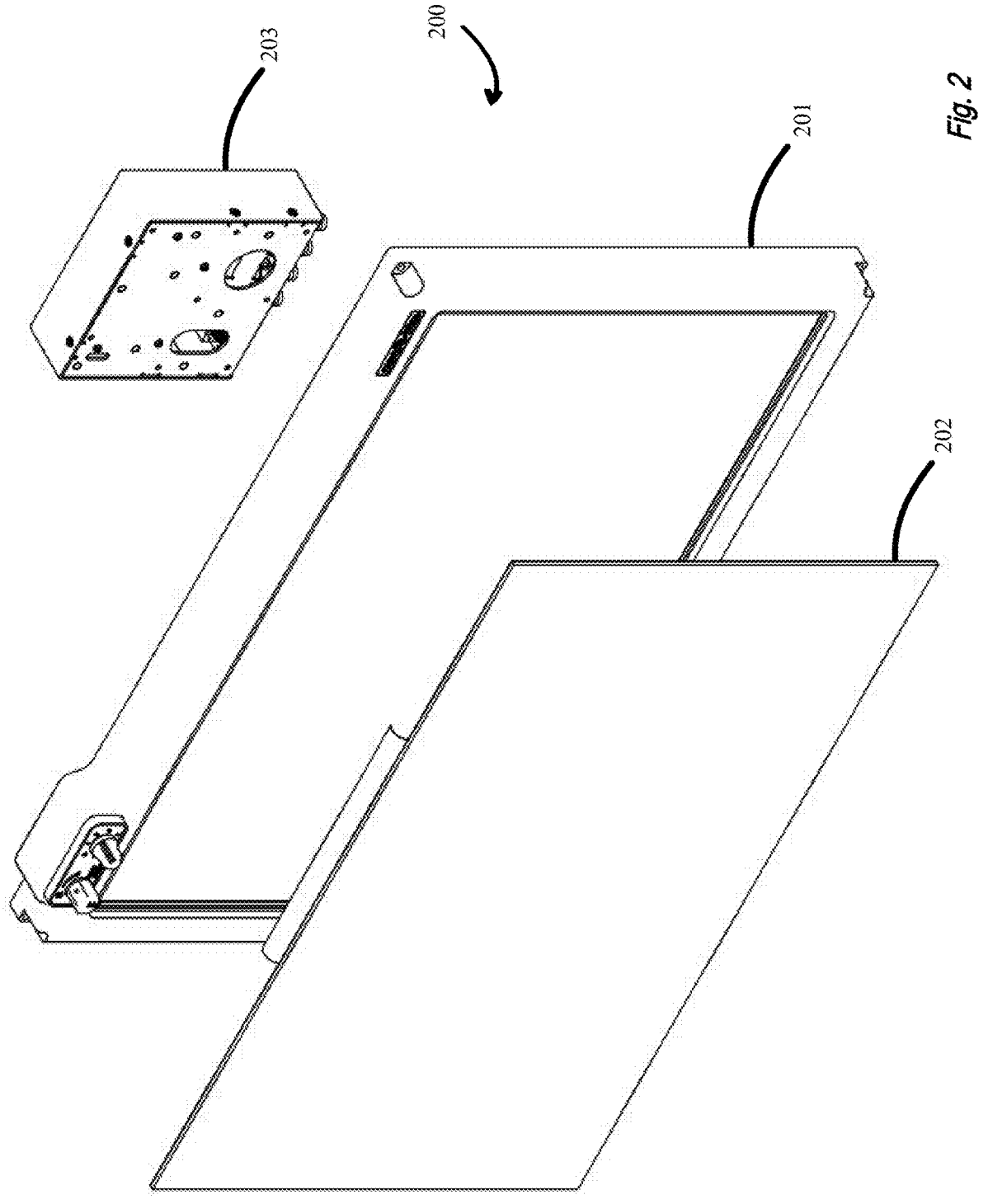
FIG. 2 depicts an exploded view of a touchscreen device according to an example embodiment.

Referring next to FIG. 2, an exploded view of a touchscreen device 200 is depicted. The touchscreen device 200 of FIG. 2 may be the same as, or similar to, the touchscreen device 100 of FIG. 1. The touchscreen device 200 includes a display 201, which may be the same as, or similar to, the display 101 of FIG. 1, a touch-sensitive layer 202, which may be the same as, or similar to, the touch-sensitive layer 102 of FIG. 1, and a controller 203.

The display 201 may be configured to receive graphical data, such as image data, text data, or video data, and output a visual representation of the graphical data for presentation to a user. As such, the display 201 may take any suitable form for carrying out these functions, examples of which may include a light-emitting diode (LED) display (e.g., an organic light-emitting diode (OLED) display, an active-matrix organic light-emitting diode (AMOLED) display, a super AMOLED display, a microLED display, etc.), a liquid crystal display (LCD) (e.g., an LED backlit LCD, a thin-film transistor (TFT) LCD, a quantum dot (QLED) display, etc.), a plasma display panel (PDP), an electroluminescent display (ELD), an electronic paper display, or a cathode ray tube (CRT) display.

The touch-sensitive layer 202 may be configured to receive a touch input (e.g., a finger touch input or a stylus touch input) and output data indicative of a location of the touch input on the touch-sensitive layer 202. As such, the touch-sensitive layer 202 may take any suitable form for carrying out these functions, examples of which may include a capacitive touchscreen (e.g., a surface capacitance touchscreen, a projected capacitance touchscreen, a mutual capacitance touchscreen, a self-capacitance touchscreen, etc.), a resistive touchscreen, an optical touchscreen, a surface acoustic wave (SAW) touchscreen, an infrared touchscreen, an infrared acrylic projection touchscreen, a touchscreen configured to operate using dispersive signal technology (DST), or a touchscreen configured to operate using acoustic pulse recognition (APR) technology.

The controller 203 may include the components of a computing device described above and may be configured to carry out various functionalities of the touchscreen device 200 described in further detail below.

Figure 3:
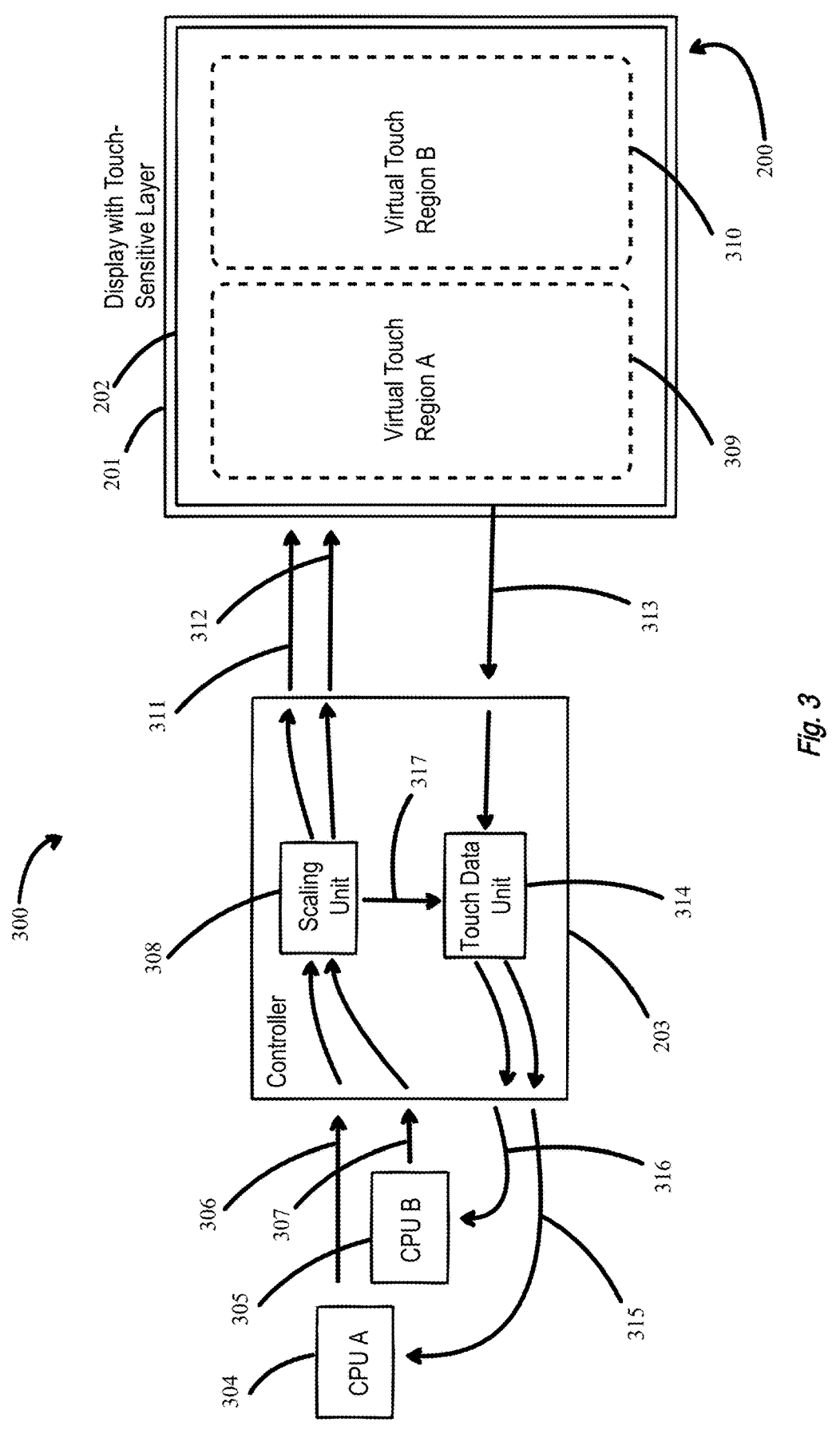
FIG. 3 depicts a block diagram of functional components of a touchscreen device according to an example embodiment.

FIG. 3 next illustrates a simplified block diagram of the touchscreen device 200 and the flow of data between the different components of the touchscreen device 200. As shown in FIG. 3, a first computing device 304, which may be the same as, or similar to, the first computing device 105 of FIG. 1, and a second computing device 305, which may be the same as, or similar to, the second computing device 106 of FIG. 1, send graphical data to the controller 203. In line with the discussion above, the graphical data may take various forms, such as image, text, or video data. Regardless of its form, the graphical data is destined for display by the display 201 of the touchscreen device 202. As such, the graphical data is also referred to herein as "touchscreen display data." Accordingly, the first computing device 304 sends first touchscreen display data 306 to the controller 203, and the second computing device 305 sends second touchscreen display data 307 to the controller 203.

The controller 203 includes a scaling unit 308 configured to scale the first and second touchscreen display data 306 and 307 for presentation by the display 201 in various display zones of the display 201. In line with the discussion above, the display 201 may have a number of different preconfigured display zones. As shown, the display 201 includes a first display zone 309 and a second display zone 310, but the display 201 may include more or fewer display zones in other examples. Each display zone may include a predefined subset of pixels of the display 201.

In some examples, the preconfigured display zones of the display 201 may be defined by a user. For example, a user may input various configuration parameters defining the display zones into a computing device, and the computing device may send those configuration parameters to the controller 203 for storage in a data storage of the controller 203. The controller 203 may then access the stored configuration parameters and cause the scaling unit 308 to scale the received touchscreen display data in accordance with the configuration parameters.

Figure 4:
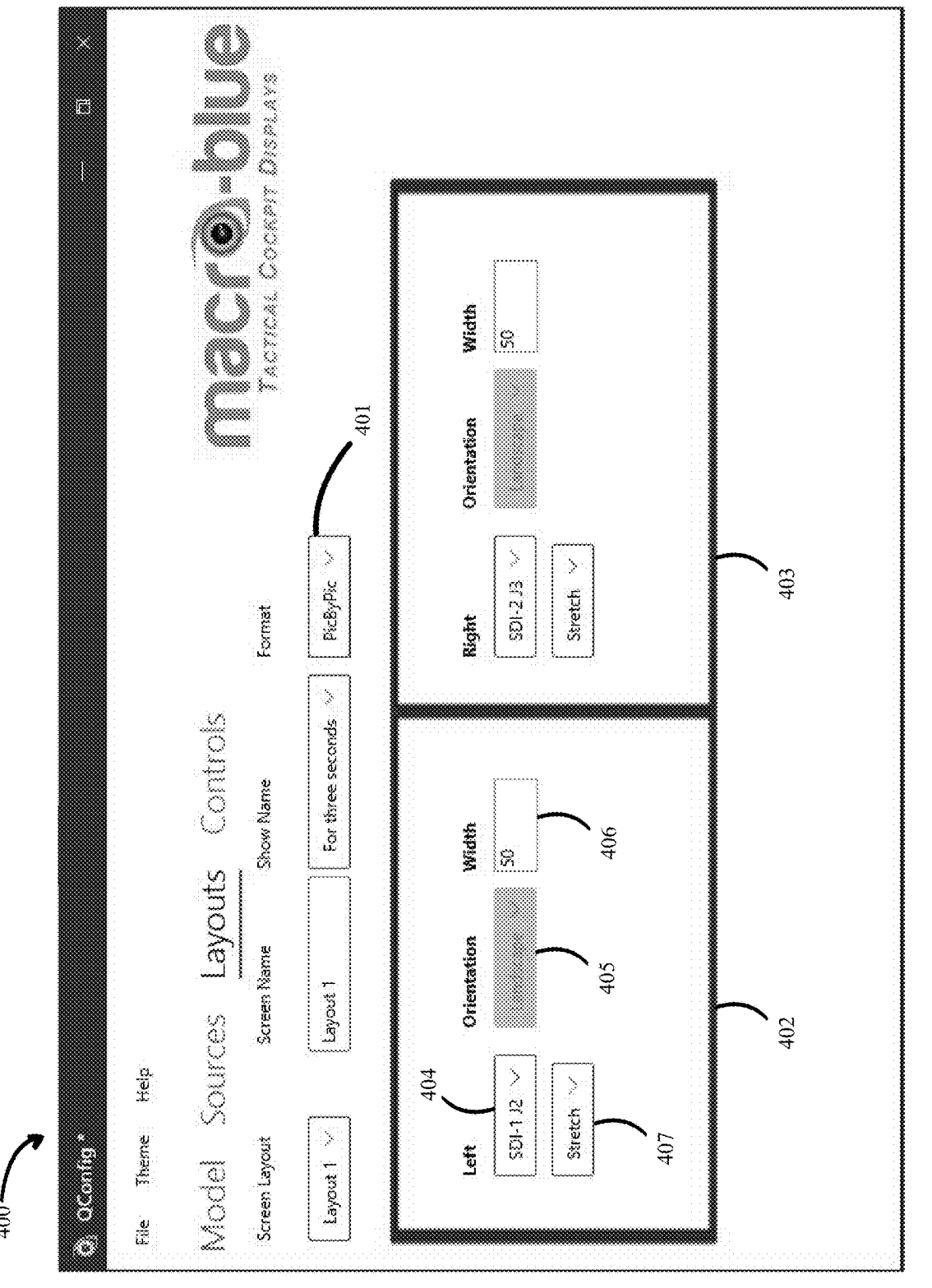
FIG. 4 depicts a user interface for configuring a layout of a touchscreen device according to an example embodiment.
Figure 5:
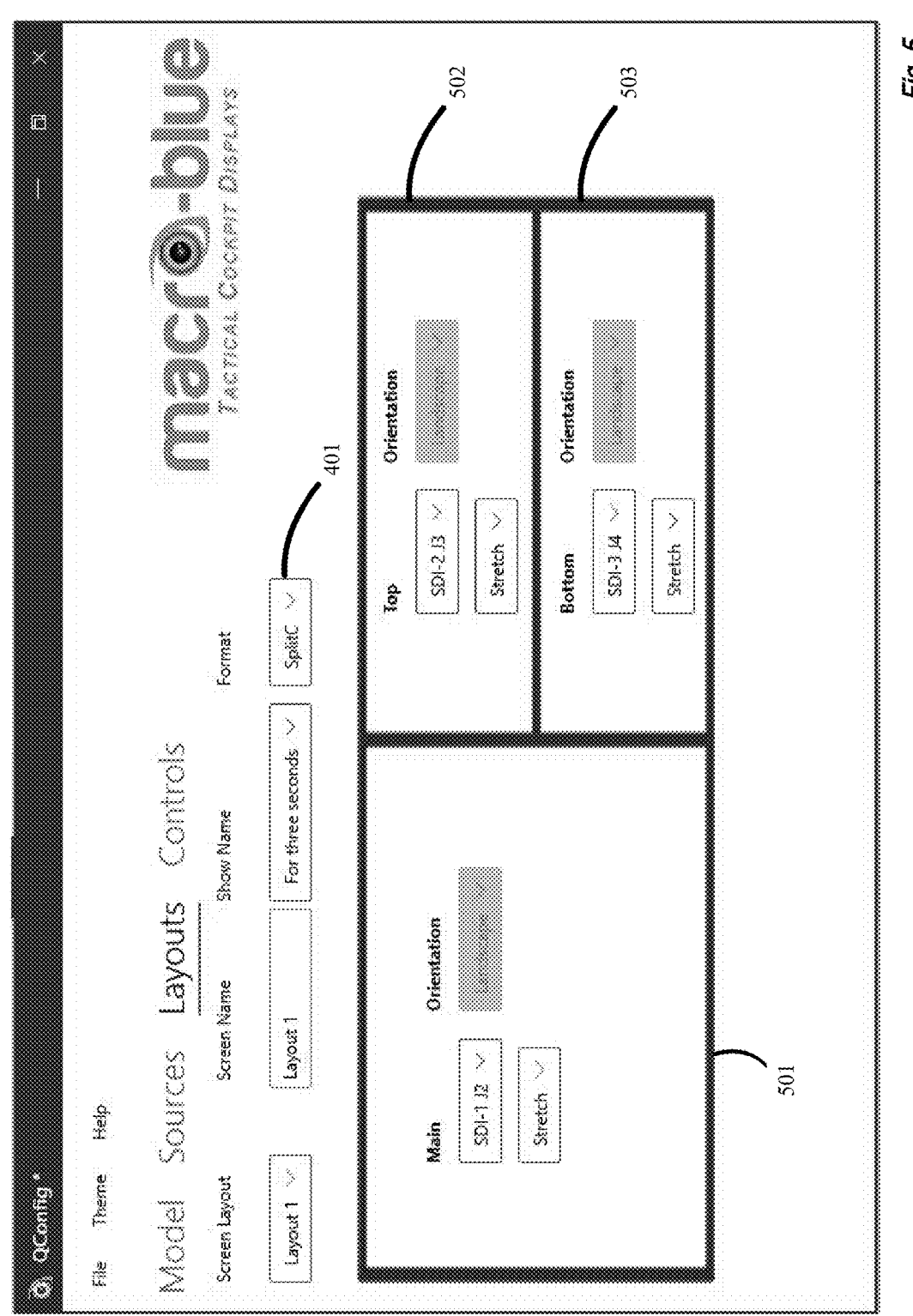
FIG. 5 depicts a user interface for configuring a layout of a touchscreen device according to another example embodiment.
Figure 6:
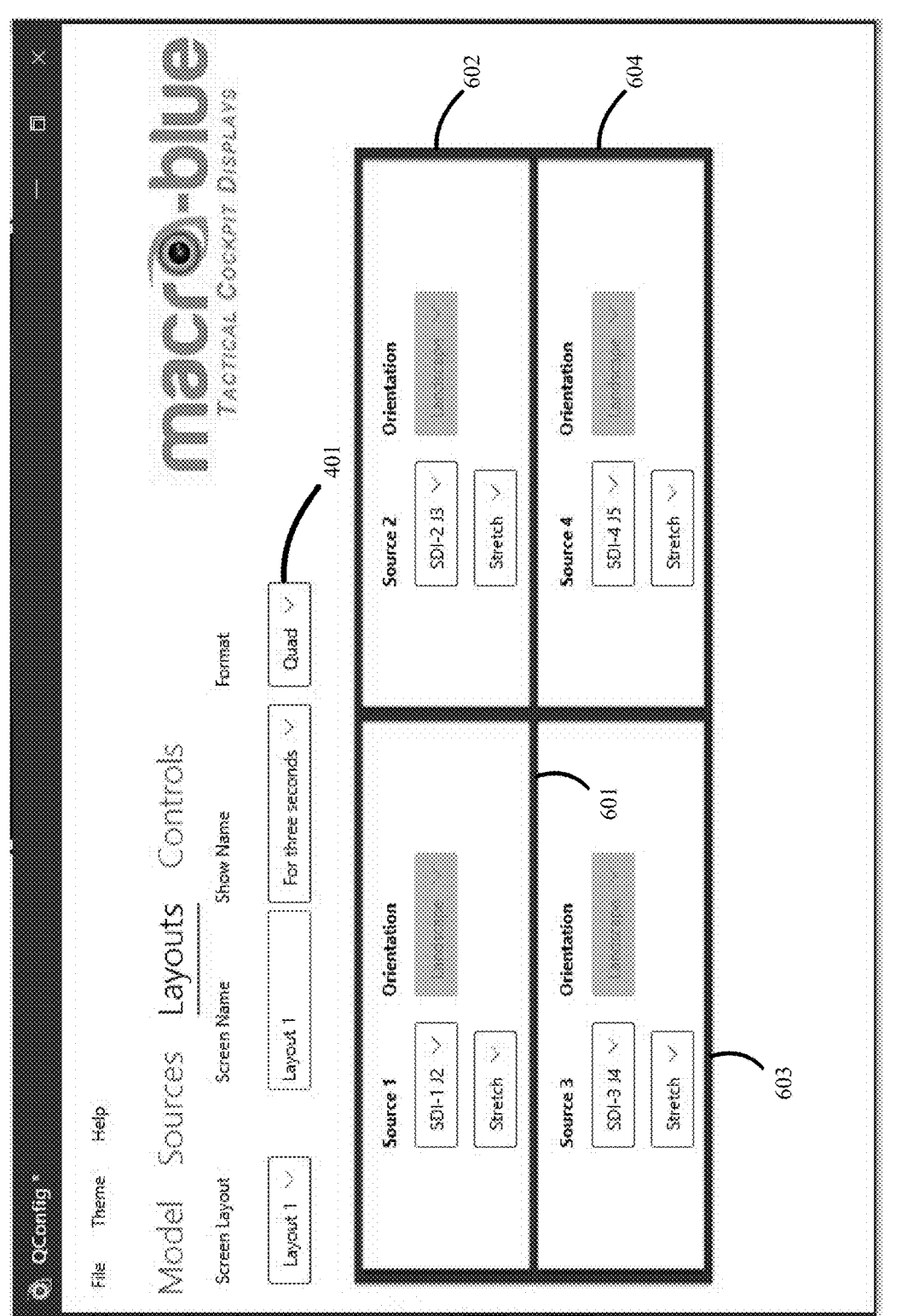
FIG. 6 depicts a user interface for configuring a layout of a touchscreen device according to another example embodiment.

FIGS. 4-6 depict example user interfaces that a computing device may present to a user for configuring the display zones of the display 201. FIG. 4 depicts a first such user interface 400. As shown, the user interface 400 may include a format input field 401 through which the user may select from a set of preconfigured formats. In the present example, the format input field 401 is set to a "PicByPic" format comprising a first display zone 402 and a second display zone 403 arranged side by side. Within this overarching format, the user may define various parameters of the first and second display zones 402 and 403. For instance, as shown, the user interface 400 may include, for each display zone, a data source input field 404, an orientation input field 405, a size input field 406, and a transformation input field 407.

The data source input field 404 of a given display zone may allow the user to specify the source of the touchscreen display data that the display 201 is configured to present in the display zone. For instance, the display 201 may include a number of input channels for receiving touchscreen display data, and the data source input field 404 may allow the user to select a respective one of the input channels for each of the display zones.

The orientation input field 405 of a given display zone may allow the user to specify the orientation at which the display 201 should display the touchscreen display data in the display zone. Example orientations include landscape and portrait orientations.

The size input field 406 of a given display zone may allow the user to specify one or more dimensions of the display zone, such as a width and/or height of the display zone. The dimensions of the display zone may be defined using various measurement units, such as number of pixels or fixed distance units (e.g., millimeters, centimeters, inches, etc.).

The transformation input field 407 of a given display zone may allow the user to specify a type of transformation applied to the touchscreen display data by the scaling unit 308 when scaling the touchscreen display data. For instance, if the touchscreen display data has a different aspect ratio than the display zone, then the scaling unit 308 may need to apply one or more transformations rather than merely proportionally scaling the display data in order to adequately fit the data into the display zone. Examples of such fit transformations that may be applied to account for such different aspect ratios include applying a stretch fit transformation, a fill fit transformation, a center fit transformation, a tile transformation, or a span transformation. However, other example transformations are possible as well.

FIG. 5 depicts another example user interface 500 that a computing device may present to a user for configuring the display zones of the display 201. The user interface 500 of FIG. 5 is largely the same as the user interface 400 of FIG. 4, but in this example the format input field 401 of the user interface 500 is set to a "SplitC" format that defines three display zones including a main display zone 501 and two smaller display zones 502 and 503 vertically stacked adjacent to the main display zone 501. Similar to the user interface 400 of FIG. 4, the user interface 500 of FIG. 5 likewise includes the same or similar input fields for allowing the user to specify various parameters of each display zone.

FIG. 6 depicts yet another example user interface 600 that a computing device may present to a user for configuring the display zones of the display 201. The user interface 600 of FIG. 6 is largely the same as the user interface 400 of FIG. 4, but in this example the format input field 401 of the user interface 600 is set to a "Quad" format that defines four display zones arranged in a 2×2 format including a first display zone 601, a second display zone 602, a third display zone 603, and a fourth display zone 604. Similar to the user interface 400 of FIG. 4, the user interface 600 of FIG. 6 likewise includes the same or similar input fields for allowing the user to specify various parameters of each display zone.

It should be understood that the example display zone configurations depicted in the user interfaces of FIGS. 4-6 are for illustrative purposes only and that numerous other display zone configurations are contemplated herein as well. For instance, the display zone configurations may include more or fewer display zones than those depicted and may be arranged in various other arrangements. In some examples, the display zones may not be immediately adjacent to one another and may be separated by a number of pixels of the display 201. Further, it should also be understood that the user interfaces of FIGS. 4-6 may allow the user to specify the parameters of the display zones in a different manner than illustrated. For instance, in some examples, the user interfaces of FIGS. 4-6 may include one or more input fields specifying particular pixels of the display 201 to include in each display zone, such as by using a coordinate system to define the corner pixels of each display zone. As another example, the user interfaces of FIGS. 4-6 may present a grid representing the pixels of the display 201, and the user may "draw" the display zones on the grid, such as by free-drawing (e.g., via a click-and-drag mouse input) a shape, dragging and dropping a predefined shape, or resizing a predefined shape on top of the grid. Other examples are contemplated herein as well.

Further, in some examples, the touchscreen device 200 may be configured to automatically select one of the display zone layouts depicted in FIGS. 4-6 based on the number of touchscreen display data feeds received by the touchscreen device 200. For instance, the touchscreen device 200 may determine that it is receiving two touchscreen display data feeds (e.g., the first touchscreen display data 306 and the second touchscreen display data 307) and responsively select a display zone configuration that includes only two display zones, such as the configuration depicted in FIG. 4. As another example, the touchscreen device 200 may determine that it is receiving three touchscreen display data feeds and responsively select a display zone configuration that includes three display zones, such as the configuration depicted in FIG. 5. As yet another example, the touchscreen device 200 may determine that it is receiving four touchscreen display data feeds and responsively select a display zone configuration that includes four display zones, such as the configuration depicted in FIG. 6. Other examples are contemplated herein as well.

Referring back to FIG. 3, the amount of scaling applied by the scaling unit 308 to the first and second touchscreen display data 306 and 307 may depend on the native resolutions of the first and second touchscreen display data 306 and 307 and the resolutions of the display zones of the display 201. For instance, the first touchscreen display data 306 may be destined for display in the first display zone 309, so the scaling unit 308 may apply a scaling that converts the first touchscreen display data 306 from its native resolution to a scaled resolution that matches the resolution of the first display zone 309. Likewise, the second touchscreen display data 307 may be destined for display in the second display zone 310, so the scaling unit 308 may apply a scaling that converts the second touchscreen display data 307 from its native resolution to a scaled resolution that matches the resolution of the second display zone 310. In this manner, the scaling unit 308 may convert the received first touchscreen display data 306 into scaled first touchscreen display data 311 and may convert the received second touchscreen display data 307 into scaled second touchscreen display data 312. And the controller 203 may output the scaled first and second touchscreen display data 311 and 312 to the display 201 for presentation in the first and second display zones 309 and 310, respectively.

The touchscreen device 200 may be configured to present the scaled first and second touchscreen display data 311 and 312 in the first and second display zones 309 and 310 in an active touch mode, such that any subsequent touch input in either zone could directly interact with the displayed data. For instance, the scaled first touchscreen display data 311 presented in the first display zone 309 may include a first selectable element (e.g., a button or the like), and the scaled second touchscreen display data 312 presented in the second display zone 310 may include a second selectable element. Presenting such data in an active touch mode may involve presenting the data such that any subsequent touch input on the first selectable element would trigger a selection of that element, and any subsequent touch input on the second selectable element would trigger a selection of that element. This provides a benefit over conventional display systems that are configured to display multiple windowed data feeds, as only one window may be active at a time, while the remaining windows are dormant. In such conventional display systems, in order to interact with a dormant window, the dormant window must first be selected in order to cause the window to transition from dormant mode to active mode while causing the previously active window to transition from active mode to dormant mode. As such, conventional display systems may require multiple inputs to interact with displayed content instead of a single touch input, as may be achieved using the techniques described herein.

While the display 201 is presenting the scaled first and second touchscreen display data 311 and 312 in the first and second display zones 309 and 310, a user may provide a touch input to the touch-sensitive layer 202. Using any of the touchscreen technologies described above or any touchscreen technology later developed, the touch-sensitive layer 202 may output touch location data 313 indicating a location of the touch input on the touch-sensitive layer 202.

The controller 203 receives the touch location data 313, and a touch data unit 314 of the controller 203 processes the touch location data 313 to determine a location on the display 201 that corresponds to the touch input. For instance, based on the location data 313 indicating the location of the touch input on the touch-sensitive layer 202, the touch data unit 314 may identify one or more pixels of the display 201 at the location of the touch input. The touch data unit 314 may then determine if the touch input was received in one of the multiple display zones of the display 201 as well as the particular display zone where the touch input was received. For instance, the touch data unit 314 may access the stored configuration parameters defining the pixels of the first and second display zones 309 and 310 and, based on the configuration parameters, determine whether the one or more pixels at the location of the touch input fall within the first display zone 309 or the second display zone 310.

Further, in addition to determining the particular display zone where the touch input was received, the touch data unit 314 may determine a location of the touch input within the particular display zone, such as by determining the coordinates of a pixel within a local coordinate system of the particular display zone. For instance, in an example where the particular display zone has a width of 100 pixels and a height of 200 pixels, the touch data unit 314 may determine that the touch input was received at a pixel in column number 75 and row number 150 (i.e., pixel coordinate (75, 150)) of the display zone.

Once the touch data unit 314 has determined the location of the touch input in the display zone, the touch data unit 314 may send an indication of this location to the appropriate source of the touchscreen display data for the display zone. For instance, if the touch data unit 314 determines that the touch input was received in the first display zone 309, then the touch data unit 314 may send the indication of the touch location to the first computing device 304, which is the source of the touchscreen display data presented in the first display zone 309. And if the touch data unit 314 determines that the touch input was received in the second display zone 310, then the touch data unit 314 may send the indication of the touch location to the second computing device 305, which is the source of the touchscreen display data presented in the second display zone 310.

In some examples, the touch data unit 314 may determine the location of the touch input and send an indication of the location to the appropriate data source without actively determining the particular display zone where the touch input was received. For example, the touch data unit 314 may determine a pixel coordinate of the touch input within the pixel coordinate system of the display 201. A first subset of the pixel coordinates of the display 201 (e.g., the pixels defining the first display zone 309) may be addressed to the first computing device 304, and a second subset of the pixel coordinates of the display 201 (e.g., the pixels defining the second display zone 310) may be addressed to the second computing device 305. In such an implementation, if the location of the touch input falls within the first subset of pixel coordinates, then the touch data unit 314 may send an indication of the touch input to the first computing device 304, and if the location of the touch input falls within the second subset of pixel coordinates, then the touch data unit 314 may send an indication of the touch input to the second computing device 305.

In any case, because the scaling unit 308 scales the first and second touchscreen display data 306 and 307 received from the first and second computing devices 304 and 305 such that the scaled first and second touchscreen display data 311 and 312 is presented in the first and second display zones 309 and 310 instead of the native first and second touchscreen display data 306 and 307, the touch data unit 314 may need to account for this scaling when sending the indication of the touch location to either of the first and second computing devices 304 and 305.

In order to account for the scaling performed by the scaling unit 308, the touch data unit 314 may receive scaling data 317 from the scaling unit 308. The scaling data 317 may take various forms and may reflect the various transformations applied by the scaling unit 308 to convert the first and second touchscreen display data 306 and 307 into the scaled first and second touchscreen display data 311 and 312.

As one example, the scaling data 317 may identify the set of transformations performed by the scaling unit 308 for the particular display zone where the touch input was received, and the touch data unit 314 may apply a reverse set of transformations to the pixels in the particular display zone to effectively undo the scaling performed by the scaling unit 308. After applying the reverse set of transformations, the touch data unit 314 may determine a new location of the touch input within the unscaled pixel data. For instance, applying the reverse set of transformations to the pixels in the particular display zone may involve translating the local pixel coordinate system of the display zone to the pixel coordinate system of the native resolution of the touchscreen display data received by the controller 203 from one of the first and second computing devices 304 and 305. As a result, the touch data unit 314 may translate the pixel coordinate of the touch input within the local coordinate system of the display zone (e.g., pixel coordinate (75, 150) in the example above) to a corresponding pixel coordinate in the coordinate system of the native resolution of the touchscreen display data.

As another example, the scaling data 317 may include mapping data that maps each pixel of each display zone to one or more corresponding pixels in the native touchscreen display data. For instance, as part of the scaling process applied to the first and second touchscreen display data 306 and 307, the scaling unit 308 may determine which pixels in the native resolution of the first and second touchscreen display data 306 and 307 correspond to which pixels in the scaled resolution of the scaled first and second touchscreen display data 311 and 312, such as by storing the coordinates of the corresponding pixels in association with one another. In such examples, the touch data unit 314 may then, after identifying the pixel coordinate of the touch input within the local coordinate system of a particular display zone, refer to the mapping data in order to translate the identified pixel coordinate within the display zone to its corresponding pixel coordinate in the native resolution of the touchscreen display data.

In any case, once the touch data unit 314 has translated the pixel coordinate of the touch input into the coordinate system matching the native resolution of the touchscreen display data, the touch data unit 314 may send the translated pixel coordinate to the source of the touchscreen display data (e.g., the first computing device 304 or the second computing device 305). The source of the touchscreen display data may then perform one or more actions based on the pixel coordinate of the touch input, such as by altering the touchscreen display data that is provided to the controller 203 and presented by the display 201 or by performing some action external to the touchscreen device 200.

Turning to FIG. 7, a flowchart 700 is shown that includes example operations that may be carried out to facilitate using a single touchscreen display as a user interface for controlling a plurality of separate computing devices through a single view of the touchscreen display. The example operations will be discussed with reference to a touchscreen device that includes a touch-sensitive display and that may carry out the example operations. In this regard, the touchscreen device may be similar to the touchscreen devices depicted in FIGS. 1-3 and may include any or all of the components of the computing device described above.

Various embodiments of the method depicted in flowchart 700 include one or more operations, functions, or actions illustrated by blocks 701 through 710. Although some of the blocks are illustrated in sequential order and others are illustrated in parallel, these blocks may also be performed in a different order than the order disclosed and described herein, where possible. Also, the various blocks may be combined into fewer blocks, divided into additional blocks, and/or removed based upon a desired implementation.

In addition, for the method depicted in flowchart 700 and for other processes and methods disclosed herein, the flowchart 700 shows functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that stores data for short periods of time like register memory, processor cache, and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also include any other volatile or non-volatile storage systems. The computer readable medium may be considered a computer readable storage medium, for example, or a tangible storage device. Still further, for the method depicted in flowchart 700 and for other processes and methods disclosed herein, each block in FIG. 7 may represent circuitry that is wired to perform the specific logical functions in the process.

Turning now to the operations of flowchart 700, at block 701, the touchscreen device receives, from a first computing device, first touchscreen display data having a first display resolution, and the touchscreen device receives, from a second computing device separate from the first computing device, second touchscreen display data having a second display resolution. In some examples, the first and second display resolutions may be the same resolution, and in other examples the first and second display resolutions may be different.

At block 702, the touchscreen device determines a first zone comprising a first subset of pixels of its touch-sensitive display and a second zone comprising a second subset of pixels of the touch-sensitive display. The first zone has a third display resolution, and the second zone has a fourth display resolution. In line with the discussion above, in some examples, the touchscreen device may determine the first and second zones using configuration data, which may be defined by a user (e.g., using the interfaces depicted in FIGS. 4-6). The configuration data may specify the third and fourth display resolutions, which may be the same or different from one another. Further, the third and fourth display resolutions will typically, but not necessarily, be different from the first and second display resolutions.

At block 703, the touchscreen device scales the first touchscreen display data from the first display resolution to the third display resolution, and the touchscreen device scales the second touchscreen display data from the second display resolution to the fourth display resolution. The touchscreen device may scale the first and second touchscreen data using various scaling techniques as described above in connection with the scaling unit 308 of FIG. 3.

At block 704, the touchscreen device displays the scaled first touchscreen display data in the first zone at the third display resolution, and the touchscreen device displays the scaled second touchscreen display data in the second zone at the fourth display resolution. In line with the discussion above, the touchscreen device may display both the scaled first touchscreen display data and the scaled second touchscreen display data in an active touchscreen mode, such that either or both of a first selectable element of the first touchscreen display data and a second selectable element of the second touchscreen display data are selectable by any subsequent touch input.

While displaying the scaled first and second touchscreen display data, the touch-sensitive display of the touchscreen device may receive a touch input. In line with the discussion above, the touchscreen device may determine a particular zone of the display where the touch input was received and responsively carry out operations for controlling the first or second computing device depending on which zone received the touch input. Blocks 705 through 707 illustrate operations that the touchscreen device may carry out when the touch input is located in the first zone, and blocks 708 through 710 illustrate operations that the touchscreen device may carry out when the touch input is located in the second zone. In some examples, the touchscreen device may concurrently receive more than one touch input, such as a first touch input in the first zone and a second touch input in the second zone. In such examples, the touchscreen device may carry out both the operations depicted in blocks 705 through 707 and the operations depicted in blocks 708 through 710 and may do so in parallel or sequentially.

At block 705, while displaying the scaled first touchscreen display data in the first zone at the third display resolution, the touchscreen device determines that the touch-sensitive display has received a first touch input at a first pixel of the scaled first touchscreen display data in the first zone.

At block 706, based on the scaling applied to the first touchscreen display data, the touchscreen device determines a third pixel of the first touchscreen display data having the first display resolution that corresponds to the first pixel of the scaled first touchscreen display data having the third display resolution. In line with the discussion above, this may involve translating the coordinates of the first pixel to new coordinates of the third pixel by performing a reverse set of transformations to undo the scaling applied to the first touchscreen display data. Alternatively, as further discussed above, this may involve accessing a set of mapping data generated by the touchscreen device when scaling the first touchscreen display data that maps each pixel in the first zone to one or more corresponding pixels of the first touchscreen display data and using the set of mapping data to map the first pixel to the third pixel.

At block 707, the touchscreen device sends, to the first computing device, information identifying a selection of the third pixel.

At block 708, while displaying the scaled second touchscreen display data in the second zone at the fourth display resolution, the touchscreen device determines that the touch-sensitive display has received a second touch input at a second pixel of the scaled second touchscreen display data in the second zone.

At block 709, based on the scaling applied to the second touchscreen display data, the touchscreen device determines a fourth pixel of the second touchscreen display data having the second display resolution that corresponds to the second pixel of the scaled second touchscreen display data having the fourth display resolution. Again, in line with the discussion above, this may involve translating the coordinates of the second pixel to new coordinates of the fourth pixel by performing a reverse set of transformations to undo the scaling applied to the second touchscreen display data. Alternatively, as further discussed above, this may involve accessing a set of mapping data generated by the touchscreen device when scaling the second touchscreen display data that maps each pixel in the second zone to one or more corresponding pixels of the second touchscreen display data and using the set of mapping data to map the second pixel to the fourth pixel.

At block 710, the touchscreen device sends, to the second computing device, information identifying a selection of the fourth pixel.

In this manner, a single touch-sensitive display of a single touchscreen device may be used as a user interface for controlling multiple different computing devices that provide touchscreen display data for display in respective zones of the touch-sensitive display. Using these techniques provides a number of improvements over existing devices including providing intuitive control of multiple different computing devices through touching the corresponding zones of the display, reducing or eliminating the need for external pointing devices, reducing or eliminating the need to select or switch between different channels of display data, and enabling seamless control of multiple computing devices on a single touchscreen display.

While the examples described herein are largely directed toward examples involving the presentation of two sets of touchscreen display data provided by two computing devices, other examples may involve the presentation of additional sets of touchscreen display data provided by additional computing devices. For instance, in some examples, the method depicted by flowchart 700 may involve the touchscreen device receiving, from a third computing device separate from the first and second computing devices, third touchscreen display data having a fifth display resolution. The touchscreen device may determine a third zone comprising a third subset of pixels of the touch-sensitive display, where the third zone has a sixth display resolution. The touchscreen device may scale the third touchscreen display data from the fifth display resolution to the sixth display resolution and display the scaled third touchscreen display data in the third zone at the sixth display resolution. While displaying the scaled third touchscreen display data in the third zone at the sixth display resolution, the touchscreen device may determine that the touch-sensitive display has received a third touch input at a fifth pixel of the scaled third touchscreen display data in the third zone. Based on the scaling applied to the third touchscreen display data, the touchscreen device may determine a sixth pixel of the third touchscreen display data having the fifth display resolution that corresponds to the fifth pixel of the scaled first touchscreen display data having the sixth display resolution. And the touchscreen device may send, to the third computing device, information identifying a selection of the sixth pixel. This process may likewise be applied to any number of display zones for presenting touchscreen display data from any number of computing devices.

Further, while the examples presented herein are specifically described in the context of receiving and processing touch inputs, including finger and stylus touch inputs, it should also be appreciated that the present examples may be implemented using other types of user input as well. For example, any or all instances of touch input disclosed herein may alternatively be replaced with a mouse input (e.g., a mouse click), a gesture input (e.g., a finger point, an eye tracking input, etc.), or any other suitable selection input.

III. CONCLUSION

The above detailed description describes various features and functions of the disclosed touchscreen devices with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A multi-zone display system comprising:
a display screen;
at least one communication interface;
at least one processor;
at least one non-transitory computer-readable medium; and
program instructions stored on the at least one non-transitory computer-readable medium that, when executed by the at least one processor, cause the multi-zone display system to:
receive, from a first computing device, first display data;
receive, from a second computing device, second display data;
determine a first zone comprising a first subset of pixels of the display screen;
determine a second zone comprising a second subset of pixels of the display screen;
display the first display data in the first zone;
display the second display data in the second zone;
while displaying the first display data in the first zone and displaying the second display data in the second zone:
determine that a first input has been received, via a first input device, at at least one first pixel of the first display data in the first zone, the first input indicating a first location within the first display data that corresponds to the at least one first pixel of the first display data;
determine that a second input has been received, via a second input device, at at least one second pixel of the first display data in the first zone, the second input indicating a second location within the first display data that corresponds to the at least one second pixel of the first display data;
determine that a third input has been received, via the second input device, at at least one first pixel of the second display data in the second zone, the second input indicating a third location within the second display data that corresponds to the at least one first pixel of the second display data;
send, to the first computing device, information identifying the first location;

send, to the first computing device, information identifying the second location; and
send, to the second computing device, information identifying the third location.

2. The multi-zone display system of claim 1, wherein the first display data has a first display resolution,
wherein the first zone has a second display resolution,
wherein the first and second input each comprise an indication of a respective location within the first display data, as displayed at the second display resolution, that corresponds to at least one respective pixel of the first display data, as represented at the first display resolution.

3. The multi-zone display system of claim 2, further comprising program instructions stored on the at least one non-transitory computer-readable medium that, when executed by the at least one processor, cause the multi-zone display system to:
scale the first display data from the first display resolution to the second display resolution.

4. The multi-zone display system of claim 3, further comprising program instructions stored on the at least one non-transitory computer-readable medium that, when executed by the at least one processor, cause the multi-zone display system to:
based on scaling applied to the first display data, generate a set of mapping data that maps each pixel in the first zone to one or more corresponding pixels of the first display data;
determine the first location within the first display data having the first display resolution that corresponds to the at least one first pixel of the first display data having the second display resolution using the set of mapping data; and
determine the second location within the first display data having the first display resolution that corresponds to the at least one second pixel of the first display data having the second display resolution using the set of mapping data.

5. The multi-zone display system of claim 1, wherein one or both of the first and second input devices comprise an input device that communicates with the multi-zone display system via the at least one communication interface.

6. The multi-zone display system of claim 1, wherein the first input device comprises a touch-sensitive layer associated with the display screen, and
wherein the second input device is a mouse.

7. The multi-zone display system of claim 6, wherein the second input device communicates with the multi-zone display system via the at least one communication interface.

8. The multi-zone display system of claim 1, wherein the first input and the second input are received concurrently.

9. The multi-zone display system of claim 1, wherein the first display data includes data representing a first selectable element, wherein the second display data includes data representing a second selectable element, and wherein displaying the first display data and the second display data comprises displaying the first display data and the second display data in an active mode such that both the first selectable element and the second selectable element are selectable by any subsequent input.

10. The multi-zone display system of claim 1, further comprising a display device comprising:
the display screen; and
one or more processors of the at least one processor.

11. The multi-zone display system of claim 1, wherein one or both of the first input and the second input comprise one or more of a finger touch input, a stylus input, a mouse input, a gesture input, an eye tracking input, or combinations thereof.

12. A non-transitory computer-readable medium having stored thereon program instructions that, when executed by at least one processor, cause a multi-zone display system to:

receive, from a first computing device, first display data;

receive, from a second computing device, second display data;

determine a first zone comprising a first subset of pixels of a display screen;

determine a second zone comprising a second subset of pixels of the display screen;

display the first display data in the first zone;

display the second display data in the second zone;

while causing the multi-zone display system to display the first display data in the first zone and displaying the second display data in the second zone:

determine that a first input has been received, via a first input device, at at least one first pixel of the first display data in the first zone, the first input indicating a first location within the first display data that corresponds to the at least one first pixel of the first display data;

determine that a second input has been received, via a second input device, at at least one second pixel of the first display data in the first zone, the second input indicating a second location within the first display data that corresponds to the at least one second pixel of the first display data;

determine that a third input has been received, via the second input device, at at least one first pixel of the second display data in the second zone, the second input indicating a third location within the second display data that corresponds to the at least one first pixel of the second display data;

send, to a first computing device, information identifying the first location;

send, to the first computing device, information identifying the second location; and send, to a second computing device, information identifying the third location.

13. The non-transitory computer-readable medium of claim 12, wherein the first display data has a first display resolution, wherein the first zone has a second display resolution, wherein the first and second input each comprise an indication of a respective location within the first display data, as displayed at the second display resolution, that corresponds to at least one respective pixel of the first display data, as represented at the first display resolution.

14. The non-transitory computer-readable medium of claim 13, further having stored thereon program instructions that, when executed by the at least one processor, cause the multi-zone display system to:

scale the first display data from the first display resolution to the second display resolution.

15. The non-transitory computer-readable medium of claim 14, further having stored thereon program instructions that, when executed by the at least one processor, cause the multi-zone display system to:

based on scaling applied to the first display data, generate a set of mapping data that maps each pixel in the first zone to one or more corresponding pixels of the first display data;

determine the first location within the first display data having the first display resolution that corresponds to the at least one first pixel of the first display data having the second display resolution using the set of mapping data; and determine the second location within the first display data having the first display resolution that corresponds to the at least one second pixel of the first display data having the second display resolution using the set of mapping data.

16. The non-transitory computer-readable medium of claim 12, wherein the first input and the second input are received concurrently.

17. The non-transitory computer-readable medium of claim 12, wherein one or both of the first and second input devices comprise an input device that communicates with the multi-zone display system via at least one communication interface of the multi-zone display system.

18. A method carried out by a multi-zone display system, the method comprising:

receiving, from a first computing device, first display data;

receiving, from a second computing device, second display data;

determining a first zone comprising a first subset of pixels of a display screen;

determining a second zone comprising a second subset of pixels of the display screen;

displaying the first display data in the first zone;

displaying the second display data in the second zone;

while the multi-zone display system displays the first display data in the first zone and displays the second display data in the second zone:

determining that a first input has been received, via a first input device, at at least one first pixel of the first display data in the first zone, the first input indicating a first location within the first display data that corresponds to the at least one first pixel of the first display data;

determining that a second input has been received, via a second input device, at at least one second pixel of the first display data in the first zone, the second input indicating a second location within the first display data that corresponds to the at least one second pixel of the first display data;

determining that a third input has been received, via the second input device, at at least one first pixel of the second display data in the second zone, the second input indicating a third location within the second display data that corresponds to the at least one first pixel of the second display data;

sending, to a first computing device, information identifying the first location;

sending, to the first computing device, information identifying the second location; and sending, to a second computing device, information identifying the third location.

19. The method of claim 18, wherein the first display data has a first display resolution, wherein the first zone has a second display resolution, wherein the first and second input each comprise an indication of a respective location within the first display data, as displayed at the second display resolution, that corresponds to at least one respective pixel of the first display data, as represented at the first display resolution, the method further comprising:

scaling the first display data from the first display reso-
lution to the second display resolution;

based on scaling applied to the first display data, gener-
ating a set of mapping data that maps each pixel in the
first zone to one or more corresponding pixels of the
first display data;

determining the first location within the first display data
having the first display resolution that corresponds to
the at least one first pixel of the first display data having
the second display resolution using the set of mapping
data; and determining the second location within the first display
data having the first display resolution that corresponds
to the at least one second pixel of the first display data
having the second display resolution using the set of
mapping data.

20. The method of claim 18, wherein the first input and
the second input are received concurrently.

* * * * *